(12) United States Patent
Baumgarten

(10) Patent No.: US 10,731,050 B2
(45) Date of Patent: Aug. 4, 2020

(54) COATING COMPOSITION

(71) Applicant: PPG Industries Ohio, Inc., Cleveland, OH (US)

(72) Inventor: Rudolf Baumgarten, Reutlingen (DE)

(73) Assignee: PPG Industries Ohio, Inc., Cleveland, OH (US)

(*) Notice: Subject to any disclaimer, the term of this patent is extended or adjusted under 35 U.S.C. 154(b) by 837 days.

(21) Appl. No.: 14/892,767

(22) PCT Filed: May 19, 2014

(86) PCT No.: PCT/EP2014/060242
§ 371 (c)(1),
(2) Date: Nov. 20, 2015

(87) PCT Pub. No.: WO2014/187775
PCT Pub. Date: Nov. 27, 2014

(65) Prior Publication Data
US 2016/0102224 A1    Apr. 14, 2016

(30) Foreign Application Priority Data
May 21, 2013   (EP) ..................................... 13168513

(51) Int. Cl.
| C09D 167/02 | (2006.01) |
| C09D 163/00 | (2006.01) |
| C09D 5/02 | (2006.01) |
| C08G 59/06 | (2006.01) |
| C08G 59/62 | (2006.01) |
| C09D 7/63 | (2018.01) |
| C08K 5/098 | (2006.01) |

(52) U.S. Cl.
CPC ......... *C09D 167/02* (2013.01); *C08G 59/066* (2013.01); *C08G 59/621* (2013.01); *C09D 5/024* (2013.01); *C09D 7/63* (2018.01); *C09D 163/00* (2013.01); *C08K 5/098* (2013.01)

(58) Field of Classification Search
CPC .............................. C09D 201/02; C09J 7/0228
See application file for complete search history.

(56) References Cited

U.S. PATENT DOCUMENTS

| 4,156,040 | A | 5/1979 | Swider et al. |
| 8,299,201 | B2 | 10/2012 | Burckhardt et al. |
| 8,871,888 | B2 | 10/2014 | Mowrer et al. |
| 2005/0171315 | A1* | 8/2005 | Wakabayashi ........... C08K 5/09 528/26 |
| 2006/0247341 | A1 | 11/2006 | Hsieh et al. |
| 2007/0026154 | A1 | 2/2007 | Yokoyama et al. |
| 2008/0268261 | A1 | 10/2008 | Schwoeppe et al. |
| 2011/0151264 | A1* | 6/2011 | Flosbach .............. C09D 133/06 428/418 |
| 2011/0240064 | A1* | 10/2011 | Wales ...................... C09D 5/14 134/26 |
| 2014/0343226 | A1 | 11/2014 | Burckhardt et al. |

FOREIGN PATENT DOCUMENTS

| EP | 1090960 | 4/2001 |
| JP | 2002226789 | 8/2002 |
| JP | 2004059613 | 2/2004 |
| JP | 3715014 B | 9/2011 |
| RU | 2137866 | 9/1999 |
| WO | 0047642 | 8/2000 |
| WO | 2010118356 | 10/2010 |
| WO | 2011019840 | 2/2011 |
| WO | 2012118501 | 9/2012 |

* cited by examiner

*Primary Examiner* — Gregory Listvoyb
(74) *Attorney, Agent, or Firm* — Diane R. Meyers

(57) ABSTRACT

A coating composition comprising i) a polymeric film forming resin, ii) a crosslinking agent suitable for crosslinking the polymeric film forming resin i), and iii) an additive comprising a bismuth carboxylic acid salt.

10 Claims, No Drawings

COATING COMPOSITION

The present invention relates to coating compositions, particularly to coating compositions for coating a metal substrate for use in the packaging industry. The invention also extends to an article coated with the coating compositions, particularly a metal container for use in the packaging industry having the coating composition applied to at least a portion thereof.

Metal containers, such as cans or tubes, are commonly used for the storage of chemically reactive contents, for example, personal hair care, foodstuffs and beverages. However, exposure of the metal to contents such as these can lead to corrosion of the metal and contamination of the contents. A protective coating is therefore generally applied to the exposed surfaces of the metal container. The protective coating prevents the contents of the container from contacting the metal and thus prevents corrosion of the metal and contamination and deterioration or alteration of the contents.

Such coatings are normally thin thermoset films. Commonly, the films will comprise a thermoset polymer and a crosslinker, such that the cured film comprises a degree of crosslinking in the polymer. An additive or catalyst may be added to increase the rate of crosslinking during curing.

The cured coatings are required to display a range of properties. These include chemical resistance, such as alkali resistance; adhesion to the metal substrate; abrasion resistance; and flexibility during the use of the coated container after application to the metal surface.

In particular, when the container is storing alkali personal cares, such as hair dyes or hair coloration, it has been found that should the alkali resistance of the coating not be sufficient, the adhesion of the coating to the substrate may be compromised. This can result in the above mentioned problems of metal corrosion and contamination of the contents, among others.

Furthermore, many currently used coatings that display an acceptable level of alkali resistance commonly contain a proportion of Bisphenol-A (BPA), its derivatives or associated compounds. Due to the apparent negative health effects of coatings comprising such compounds, there is a demand for coating compositions which comprise substantially none of these compounds but which display comparative or improved properties, such as alkali resistance, for example.

It is therefore an object of aspects of the present invention to address one or more of the above mentioned or other problems.

According to a first aspect of the present invention there is provided a coating composition comprising;
 i) a polymeric film forming resin,
 ii) a crosslinking agent suitable for crosslinking the polymeric film forming resin i), and
 iii) an additive comprising a bismuth carboxylic acid salt.

Advantageously, it has been surprisingly found that a coating composition having the above mentioned components provides a coating with suitable or improved resistance to alkali contents. Such coating compositions also provide suitable or improved other properties, such as adhesion, flexibility and abrasion resistance.

According to another aspect of the present invention there is provided a metal substrate coated with a coating composition according to the first aspect of the present invention on at least a portion thereof.

According to another aspect of the present invention there is provided an aluminium substrate coated with a coating composition according to the first aspect of the present invention on at least a portion thereof.

According to another aspect of the present invention there is provided a method of coating a metal substrate comprising applying thereto a coating composition according to the first aspect of the present invention.

According to another aspect of the present invention there is provided the use of a bismuth carboxylic acid salt as an additive in a coating composition for increasing the alkali resistance of a substrate coated with the coating composition.

According to another aspect of the present invention there is provided a method of increasing the alkali resistance of a coated substrate, the substrate being coated with a coating composition, the method comprising the use of a bismuth carboxylic acid salt additive in the said coating composition.

A polymeric film forming resin may be any resin capable of reacting with the crosslinker to thereby allow crosslinks to form in the polymeric film forming resin.

Suitably, the polymeric film forming resin comprises a functionalised resin such that the resin comprises functional groups suitable to react with a crosslinker so as to allow for the formation of crosslinks in the resin.

Preferably, the functional groups of the film forming resin comprise one or more epoxy, hydroxyl and/or carboxyl groups.

The polymeric film forming resin may comprise any proportion of functional groups suitable for reacting with the crosslinker. In one embodiment, the polymeric film forming resin may have suitable hydroxyl groups in an amount of 3 to 200 mgKOH/gm. For instance, a polyester film forming resin may have suitable hydroxyl groups in an amount of 3 to 110 mg KOH/gm. In another embodiment, the polymeric film forming resin may have suitable epoxy groups in an amount of 200 to 750 mmol/kg. In yet another embodiment, the polymeric film forming resin may have suitable hydroxyl groups in an amount of 3-30% (w/w %). In yet another embodiment, an epoxy film forming resin may have suitable hydroxyl groups in an amount of 175 to 195 mg KOH/gm.

The polymeric film forming resin may be present in the coating composition in any amount between about 30-90 wt % (based on the dry weight of the coatings ingredients) and more suitably between 40-85 wt % (based on the dry weight of coatings ingredients), such as between about 50-80 wt % (based on the dry weight of the coatings ingredients) and more suitably between 50-70 wt % (based on the dry weight of coatings ingredients). In one embodiment, the polymeric film forming resin may be present in the coating composition in any amount between about 60-70 wt % (based on the dry weight of the coatings ingredients).

The polymeric film forming resin typically has a weight average molecular weight in the range of 3000-100000. In one embodiment the polymeric film forming resin may have a weight average molecular weight in the range of 10000-100000, such as 20000-65000. In another embodiment, the polymeric film forming resin may have a weight average molecular weight in the range of 3000-10000, and more suitably between 3000-6000.

In some embodiments, the polymeric film forming resin exhibits a glass transition temperature ($T_g$) greater than 20° C., and more suitably greater than 45° C.

Preferably, the polymeric film forming resin comprises one or more functionalised, linear or branched resin. The polymeric film forming resin may be selected from epoxy, polyester, and/or polyacrylate; the polymeric film forming resin may also be a mixture of one or more polymers of each type or mixtures of different types of resin. The polymeric film forming resin may be selected from copolymers formed from mixtures of epoxy resin with polyester or acrylic polymer components or a copolymer obtained from the reaction of a polyester polymer with acrylic resin components. The polymeric film forming resins may be saturated or unsaturated. The polymeric film forming resins may be substituted or unsubstituted.

In one embodiment, the film forming resins comprise one or more polyester resins. Suitable polyester resins according to the present invention can include one or more of Uralac SN 800 or Uralac SN 805 or Uralac SN 808 or Uralac SN 842 or Uralac SN 859 or Uralac SN 860 or Uralac SN 905 or Uralac SN 908 or Uralac SN 989 or Uralac SN978 (commercially available from DSM), Italkid 212 or Italkid 218 or Italkyd 226 or Italkid 228 or Italkid 231 or Italkid 300 (commercially available from Galstaff-Multiresine), Domopol 5101 or Domopol 5102 or Domopol 5111 or Domopol 5112 or Domopol 5113 or Domopol 5117 or Domopol 5132 (commercially available from Helios), Dynapol LH 818 or Dynapol LH820 or Dynapol LH823 or Dynapol LH830 or Dynapol LH833 (commercially available from Evonik), Uralac P1580 or Uralac 4215 or Uralac 5080 or Uralac 5930 or Uralac 6024 or Uradil 250 or Uradil 255 or Uradil 258 or Uradil SZ 260 or Uradil SZ 262 (commercially available from DSM), Italester 217 or Italester 218 (commercially available from Galstaff-Multiresine).

Suitable epoxy resins according to the present invention can include one or more of D.E.R. 667 or D.E.R. 664 or D.E.R 662 or D.E.R 669E or D.E.R 668 or D.E.R 671 or D.E.R 734 or D.E.R 731 (commercially available from Dow Chemical Company), Araldite GT6097 or Araldite GT6099 or Araldite GT7077 or Araldite GT6071 or Araldite GT6609 or Araldite GT6610 or Araldite GT7004 or Araldite GY 250 or Araldite GZ280 or Araldite GZ 7071 (commercially available from Jubail Chemical Industries Company), Epotec YDH184 or Epotec YDH 3000 or Epotec YD017 or Epotec YD019 or Epotec YD010 (commercially available from Additya Birla India).

Suitable epoxy resins may also include polymers or copolymers derived from epichlorohydrin and phenolic or hydroxyl components other than Bisphenol A. These are so called Bisphenol A free epoxy materials. Non limiting examples of the phenolic or Hydroxyl materials which could be used include bisphenol F, resorcinol, 4,4' di hydroxy biphenyl, 2,2' dihydroxy biphenyl, dihydroxy naphthalene materials such as 2,6 dihydroxy naphthalene, 2,7 dihydroxy naphthalene and cyclohexane dimethanol. The phenolic hydroxyl component is combined with epichlorohydrin to make the diglycydyl ether or higher polymer which can be further advanced in molecular weight with more hydroxyl or phenolic material. Examples include Epon 862 and Heloxy 107 (from Momentive) Erisys RDGE (from CVC thermoset materials) Denacol EX-201 (from Nagase Chemtex) and derivatives thereof.

Suitably, a polyacrylate (co)polymer is formed from one or more type of $C_0$ to $C_6$ alkyl ($C_0$ to $C_1$ alk) acrylate monomer units. Examples of suitable $C_1$ to $C_6$ alkyl ($C_0$ to $C_1$ alk) acrylate materials include (meth)acrylic acid, methyl (meth)acrylate; ethyl (meth)acrylate; propyl (meth)acrylate; butyl (meth)acrylate. The $C_1$ to $C_6$ alkyl ($C_0$ to $C_1$ alk) acrylate may comprise one or more functional group, such as an epoxy group, hydroxyl group or alkoxy methyl ether. For example a $C_1$ to $C_6$ alkyl ($C_0$ to $C_1$ alk) acrylate may comprise glycidyl methacrylate, hydroxy ethyl acrylate, hydroxyethyl methacrylate or n-butoxymethylacrylamide. The reaction mixture may further comprise one or more ethylenically unsaturated monomer. In one embodiment, the reaction mixture may comprise an aryl substituted ethylenically unsaturated monomer, such as styrene, for example.

Suitable polyacrylate (co)polymers according to the present invention can include one or more of Hydroxyl or acid functional solution acrylic resins such as Paraloid AT-746, Paraloid AT-63 Paraloid AT-81, Paraloid AT-147 Paraloid AT-85 or Paraloid AT-9L0 from Dow Chemical or polymers such as Synocryl 7013 SD50 from Arkema. Polyacrylate materials suitable for this invention may also include polymers as described in U.S. Pat. No. 7,858,162. For example, an acrylic homopolymer or copolymer. Various acrylic monomers can be combined to prepare the acrylic (co) polymer used in the present invention. Examples include methyl(meth)acrylate, ethyl(meth)acrylate, butyl(meth) acrylate, hydroxy alkyl(meth)acrylate, 2-ethylhexyl(meth) acrylate, behenyl (meth)acrylate, lauryl(meth)acrylate, allyl (meth)acrylate isobornyl(meth)acrylate, ethylene glycol di(meth)acrylate, (meth)acrylic acid, vinyl aromatic compounds such as styrene and vinyl toluene, nitrites such as (meth)acrylonitrile, and vinyl ester such as vinyl acetate. Any other acrylic monomers known to those skilled in the art could also be used. The full details of U.S. Pat. No. 7,858,162 are incorporated herein by reference, The term "(meth)acrylate" and like terms are used conventionally and herein to refer to both methacrylate and acrylate.

Suitable film forming polymers can also include copolymers of polyacrylates with polyester materials. Examples of copolymers of this type and various methods for their preparation are described in U.S. Pat. No. 7,745,508. For example, the polyester and acrylate copolymer can be in the formation of a graft copolymer. A graft copolymer can be formed using techniques standard in the art. In one method, the polyester is prepared according to conventional methods using the materials described above. The acrylic monomers are then added to the polyester. The acrylic can then be polymerized using a standard free radical initiator. In this manner, the acrylate copolymer is grafted to the already-made polyester. Alternatively, the polyester can be grafted to an already-made acrylic copolymer. In this embodiment, a maleic anhydride group can be polymerized in the acrylic copolymer and, subsequently, hydroxyl groups from the polyester can be allowed to react with the acrylic to create a graft copolymer; the result will be an acrylic copolymer having polyester moieties grafted thereto. In the methods for grafting, one selects a moiety to be incorporated into the polyester and a monomer to be included with the acrylate monomers that will react with each other. A particularly suitable example uses maleic anhydride in the formation of a polyester and styrene as one of the acrylic monomers. In this embodiment, the styrene will react with the maleic anhydride; the acrylic copolymer will grow off of the styrene through the formation of free radicals. The result will be a polyester having acrylic copolymers grafted thereto. It will be appreciated that not all of the acrylic and polyester will graft; thus, there will be some "neat" polyester and some "neat" acrylate copolymer in the solution. Enough of the acrylate copolymer and polyester will graft, however, to compatibilize the two normally incompatible polymers. It will be appreciated that maleic anhydride and styrene are offered as examples of two components that will promote grafting between the normally incompatible polymers, but that the copolymers are not so limited. Other compounds such as fumaric acid/anhydride or itaconic acid/anhydride may be incorporated into a polyester for grafting with a styrene containing acrylic. Other moieties that will promote grafting between the polyester and acrylic can also be used. Any group of compounds can be used for this purpose. All of these compounds are referred to herein as "graft promoting components". The amount of graft promoting component used in each of the polyester and/or acrylate portions can affect the final product. If too much of these components are used, the product can gel or be otherwise unusable. The graft-promoting components should therefore be used in an amount effective to promote grafting but not to cause gelling. Enough grafting should be effected to allow the polyester and acrylate polymers to be compatible. In the maleic anhydride/styrene example, usually 2 to 6 weight percent maleic with 8 to 30 weight percent styrene can be used, with weight percent being based on the weight of the polyester and the weight of the acrylic, respectively. The full details of U.S. Pat. No. 7,745,508 are incorporated herein by reference.

The crosslinker of the present invention comprises one or more crosslinking agents suitable for crosslinking the polymeric film forming resin. For example, the crosslinking agent may be selected from one or more of a hydroxyl substituted aromatic group containing agent, an isocyanate group containing agent, an amino group containing agent, an amine group containing agent, a urea-formaldehyde agent or an alkylated urea with imino functionality. The crosslinker may be a single molecule, a dimer, an oligomer, a (co) polymer or a mixture thereof. Preferably, the crosslinker is a dimer or trimer.

In one embodiment, the crosslinking agent comprises at least one hydroxyl substituted aromatic group, suitably one or more di-hydroxyl substituted aromatic group.

Suitably, the coating composition may comprise a crosslinker selected from an optionally substituted phenol-aldehyde or phenol-ketone (co)polymer, preferably a phenol-aldehyde (co)polymer. Such a phenol-aldehyde (co)polymer may comprise one or more of phenol-formaldehyde (co) polymer or phenol-acetaldehyde (co)polymer. For example, the crosslinker may comprise an optionally substituted phenol-formaldehyde (co)polymer.

Various commercially available crosslinkers are suitable for use in the present invention. For example, suitable phenolic materials include Phenodur EK-827 or Phenodur VPR1785 or Phenodur PR 515 or Phenodur PR516 or Phenodur PR 517 or Phenodur PR 285 or Phenodur PR612 or Phenodur PH2024 (commercially available from Cytec Industries), SFC 112 (commercially available from Schenectady) or Bakelite 6535 or Bakelite PF9989 or Bakelite PF6581 (commercially available from Momentive) or other type of crosslinkers to react with the OH groups externally.

Suitable isocyanate containing crosslinking agents may include one or more of IPDI (isophorone diisocyanate) like Desmodur VP-LS 2078/2 or Desmodur PL 340 (commercially available from Bayer) or Vestanat B 1370 or Vestanat B1358A (commercially available from Evonik) or blocked aliphatic polyisocyanate based on HDI like Desmodur BL3370 or Desmodur BL 3175 SN (commercially available from Bayer) or Duranate MF-K60X (commercially available from Asahi KASEI) or Tolonate D2 (commercially available from Perstorp) or Trixene-BI-7984 or Trixene 7981 (commercially available from Baxenden).

Suitable amino containing crosslinking agents may include one or more of Melamine formaldehyde type materials of the hexakis(methoxymethyl)melamine (HMMM) type such as Komelol 90GE (commercially available from Melamin), Maprenal MF900 (commercially available from Ineos Melamines) or Resimene 745 or Resimene 747 (commercially available from Ineos Melamines) or Cymel 303 or Cymel MM100 (commercially available from Cytec). Other melamine formaldehyde type material such as butylated methylol melamine type resins such as Cymel 1156 or Cymel 1158 (commercially available from Cytec) or mixed ether type methylal melamine resins such as Cymel 1116, Cymel 1130, Cymel 1133 or Cymel 1168 (commercially available from Cytec) or part methylolated and part methalated melamine type resins such as Cymel 370, Cymel 325 or Cymel 327 (commercially available from Cytec).

Other types of suitable amino containing crosslinking agents may include one or more of benzoguanamine formaldehyde type materials like Cymel1123 (commercially available from Cytec), Itamin BG143 (commercially available from Galstaff Multiresine) or Maprenal BF892 (commercially available from Ineos). Further examples of suitable amino resins include glycouril based materials such as Cymel 1170 and Cymel 1172 (commercially available from Cytec).

In some embodiments, for example when the polymeric film forming resin comprises an epoxy resin, the crosslinker may have amine functionality that can crosslink with the epoxy resin.

Suitable amine containing crosslinking agents may include one or more of Triethylenetetramine (commercially available from Bayer), Aradur 115 BD, 125BD, 140BD (commercially available from Huntsman), dicyandiamide (commercially available from AlzChem) or CASAMID DMPFF.

Suitable urea-formaldehyde containing crosslinking agents may include one or more of Cymel U-80 or Cymel U-60 (commercially available from Cytec Industries), Maprenal UF 264 (commercially available from Ineos), Astro Set 90 (commercially available from Momentive), Arazin 42-316 or Arazin 42-338 or Arazin 42-360 or Arazin 42-365 or Arazin 42-367 or Arazin 42-378 (commercially available from Bitrez).

The crosslinking agent may be present in the coating composition in an amount of between about 10-60 wt % (based on the dry weight of the coatings ingredients), such as between about 10-50 wt % (based on the dry weight of the coatings ingredients). In one embodiment, the crosslinker may be present in the coating composition in any amount between about 15-50 wt % (based on the dry weight of the coatings ingredients), such as between about 25-45 wt % (based on the dry weight of the coatings ingredients), more suitably between about 30-40 wt % (based on the dry weight of the coatings ingredients).

In certain embodiments, the coating compositions of the present invention may be essentially free and/or may be completely free of bisphenol A and derivatives or residues thereof, including bisphenol A ("BPA") and bisphenol A diglycidyl ether ("BADGE"). Such coating compositions are sometimes referred to as "BPA non intent" because BPA, including derivatives or residues thereof, are not intentionally added but may be present in trace amounts because of impurities or unavoidable contamination from the environment. The coating compositions can also be substantially free and may be essentially free and/or may be completely free of bisphenol F and derivatives or residues thereof, including bisphenol F and bisphenol F diglycidyl ether ("BFDGE"). The term "substantially free" as used in this context means the coating compositions contain less than 1000 parts per million (ppm), "essentially free" means less than 100 ppm and "completely free" means less than 20 parts per billion (ppb) of any of the above mentioned compounds, derivatives or residues thereof.

The present invention further comprises an additive comprising a bismuth carboxylic acid salt.

The bismuth carboxylic acid salt is suitably present in the coating composition in an amount within the range 0.2-6 wt % (based on the dry weight of the coatings ingredients), such as between about 0.2-5 wt % (based on the dry weight of the coatings ingredients). In one embodiment, the bismuth carboxylic acid salt may be present in the coating composition in any amount between about 0.5-3 wt % (based on the dry weight of the coatings ingredients), such as between about 0.5-2 wt % (based on the dry weight of the coatings ingredients).

The bismuth carboxylic acid salt is suitably present in the coating composition in an amount of at least 0.5 wt % (based on the dry weight of the coatings ingredients), such as at least 0.6 wt % (based on the dry weight of the coatings ingredients).

The bismuth carboxylic acid salt is suitably present in the coating composition in an amount of less than 5 wt % (based on the dry weight of the coatings ingredients), such as less than 2 wt % (based on the dry weight of the coatings ingredients).

The bismuth carboxylic acid salt suitably has a pH of 4-8, such as 5-7. Suitably, the pH of the bismuth carboxylic acid salt is substantially neutral, such as about pH 6 to 7, for example, pH 7.

The carboxylic acid component of the bismuth carboxylic acid salt according to the present invention suitably comprises one or more optionally substituted, straight or branched 2 to 20 member carbon chain, such as one or more optionally substituted straight or branched 6 to 14 member carbon chain. In one embodiment, the carboxylic acid component of the bismuth carboxylic acid salt according to the present invention suitably comprises one or more optionally substituted, straight or branched 8 to 12 member carbon chain.

The carboxylic acid component of the bismuth carboxylic acid salt may be selected from one or more optionally substituted straight or branched hexanoic acid, heptanoic acid, octanoic acid, nonanoic acid, decanoic acid, undecanoic acid, dodecanoic acid and/or tridecanoic acid, and iso- and neo-forms thereof.

Suitably, the bismuth carboxylic acid salt is selected from one or more of optionally substituted straight or branched bismuth octanoate, bismuth nonanoate, bismuth decanoate, bismuth neodecanoate and/or bismuth undecanoate.

In one embodiment, the bismuth carboxylic acid salt comprises bismuth neodecanoate.

Various commercially available bismuth carboxylic acid salts are suitable for use in the present invention. For example, TIB KAT 716, or TIB KAT 716LA, TIB KAT 716 XLA, TIB KAT 720, (commercially available from TIB Chemicals), Borchi Kat-24 or Borchi Kat-315 or Borchi-Kat 320 (commercially available from OMG Borchers), K-KAT XC-B221 or K-KAT 348 or K-KAT XK-601 (commercially available from King Industries), Coscat 83 (commercially available from Vertellus Speciality Inc.), DABCO MB20 (commercially available from Air Products and Chemicals).

The bismuth carboxylic acid salt additive may increase the rate of the crosslinking reaction between a crosslinker and a polymeric film forming resin of the present coating composition. The bismuth carboxylic acid salt additive may catalyse the crosslinking reaction between the crosslinker and the polymeric film forming resin. The bismuth carboxylic acid salt additive, or residues thereof, may remain bonded to the crosslinked polymer film.

The coating composition may be formed with or without a liquid carrier. Should a liquid carrier be present, the coating composition may form a dispersion in the liquid carrier phase.

When a liquid carrier is present, the coating composition suitably has a solids content of between 20-50 wt %. The amount of liquid carrier included in the coating composition is dictated primarily by the required rheological properties for the application of the composition to the substrate. A sufficient amount of carrier liquid will normally be an amount that allows for easy processing and application to the metal substrate as well as sufficient removal during the desired curing time.

The liquid carrier comprises one or more diluents, preferably one or more hydrocarbon diluent. Suitable hydrocarbon diluents can include the aromatic hydrocarbons xylene, mixed xylenes, solvesso 100 (available from Exxon Chemical) or similar commercially available aromatic hydrocarbon mixtures and Solvesso 150 or Solvesso 150 (Naphthalene depleted) (available from Exxon Chemical) or similar commercially available aromatic hydrocarbon mixtures or esters such as Propylene Glycol Methyl Ether acetate or glycol ether such Dowanol PM or Dowanol DPM (commercially available from Dow).

A coating composition according to the present invention may optionally further comprise one or more lubricant, such as is know in the art.

A coating composition according to the present invention may optionally further comprise one or more pigment, such as is known in the art.

Furthermore, as will be appreciated by those skilled in the art, depending upon the desired application, the coating compositions of the present invention may further comprise other additives such as water, coalescing solvents, levelling agents, defoamers (e.g. modified (poly)siloxanes), thickening agents (e.g. methyl cellulose), cure accelerators, suspending agents, surfactants, adhesion promoters, cross-linking agents, dispersants (e.g lecithin), corrosion inhibitors, wetting agents, fillers (e.g. titanium dioxide, zinc oxide, aluminium), matting agents (e.g. precipitated silica) and the like.

A coating composition according to the present invention may be prepared by mixing of the components after the resin is dissolved into solvents, if necessary (e.g with solid resin).

A coating composition of the present invention may be applied to a range of containers, such as aluminium tubes, for example. The containers may be used in the packaging of a range of contents, such as alkali foodstuffs, beverages, or cosmetics. Preferably, the coating compositions of the present invention are applied to containers intended for the packaging of cosmetics.

A coating composition of the present invention may be applied to such a container by the methods known in the art. For example, the coating compositions may be applied by filling a container with the coating composition and then draining the coating. The remaining composition may then be cured by known methods, such as heating.

A container comprising a coating formed from a coating composition of the present invention may provide improved alkali resistance on the coated surfaces. Furthermore, the coating provide may suitable physical properties including toughness, adhesion, formability, chemical resistance, flexibility and abrasion resistance.

For a better understanding of the invention, and to show how embodiments of the same may be carried into effect, reference will now be made, by way of example, to the following experimental data.

Coating compositions according to the present invention were prepared and applied to a metal container. The coated containers were tested for solvent, chemical and alkali resistance. Details of the preparation, application, testing methods and results are as follows.

Coating Application of Uncoated Aluminium Tubes

Coatings were coated on aluminium tubes. About 2 grams of the inventive coating formulations were filled individually into an aluminium tube then drained 10 minutes where the tube was hanging up side down thereby coating the internal of the tube. Subsequently the tube was placed into a convection oven to be cured at 230° C. for 4 minutes. The coated tubes were tested for ammonia resistance according to the procedures described below.

Coating Application of Uncoated Aluminium Panels:

Coatings were prepared by drawing the inventive coating samples with a #28 wire-wound rod. Subsequently the coated panels were placed into a convection oven to be cured for 4 minutes at 180° C., at 200° C. and at 230° C. The coated sheets were evaluated for solvent resistance such as NMP (N-Methyl Pyrrolidone) and chemical resistance by carrying out the blue-test.

TEST METHODS

NMP Test:

Coated panels were immersed in N-Methyl Pyrrolidone NMP in a glass container closed with a lid at room temperature for 24 hours. The coated parts were removed, washed up into a glass filled with MEK (Methyl Ethyl Ketone) and then dried. A hard rod coated with PTFE was brought into contact with the coating and moved forth-and-back with pressure 10 times over the coated surface. The coatings were checked on their ability to resist the chemical attack by NMP using a visual scale of 1-5 with 5 being the best.

Blue-Test:

Solution: 1.5% Methyl-Violett 2b (f.e. Basonyl violet 600 from BASF) solved in 10% Glyzerin/38.30% THFA/50.00% 2-Propanon and 0.2% Tego Wet KL 245 from Evonik (wetting agent). Ca. 1-3 ml of this solution is dropped on the surface of the dried coating (drying conditions 4'180° C., 4'200° C. and 4'230° C.: See table). After 5 minutes the solution is swept away and the coatings were evaluated for colouring and softening using a scale 1-5 with 5 being the best.

Ammonia Test:

The coated tubes were filled under the hood with 40 ml of 25% ammonia solution (Standard filling grade for 28×133 mm tubes). The tubes were then closed. The ammonia solution was allowed to act for 3 hours at 40° C. The tubes were then emptied, rinsed with water and carefully cut with the scissors. The film of coating was examined for blisters and for removal from the aluminium substrate at the cutting edge. Triangle Test: Two cuts were made at the side of the aluminium (distance around 10 mm). The aluminium was torn from the cuts in the opposite direction of the coating side in a form of a triangle and adhesion loss judged: The coatings were evaluated on their adhesion property at the cutting edge using a scale of 1-5 with 5 being the best.

The inventive and comparative compositions provided in Table 1 below were each formed from proportions of a polymeric films forming resin selected from an epoxy resin, a first type of polyester or a second type of polyester; a Bakelite crosslinking composition; and an additive selected from a substantially neutral bismuth neodecanoate composition, an alkali triaminophenol composition, or an acidic benzoic sulphonic acid composition. Each of the compositions further contained 0.05% w/w of the composition of the further additive byk 313 (15% solution of a polyester modified polydimethylsiloxane in 2-methoxy-1-methylethyl acetate). Comparative compositions 1-2 and inventive composition 1 further comprised 10% w/w of liquid carrier Dowanol DPM and 16% w/w of liquid carrier xylene. Comparative compositions 3-8 and inventive compositions 2-3 further comprised 15% w/w of Dowanol DPM liquid carrier and 19% w/w of xylene liquid carrier. A complete list of the component proportions are detailed in Table 1 below.

Epoxy Resin A

A stirred heated reaction vessel was equipped with a reflux condenser and nitrogen sparging, liquid epoxy resin Epikote 880 (2615 gm) (available from Shell Chemicals) was added to the vessel and heated to 95 deg C. Bisphenol A (1385 gm), Ethyl triphenyl phosphonium iodide (2.88 gm) and Hydrocarbon Solvent Solvesso 100 (800 gm) (available from Shell Chemicals) were added and the reaction mixture was reheated to 95 deg C. The temperature of the reaction mix was then raised to 155 deg C. over a period of 2 hours, the temperature was then maintained at 155 deg C. Samples were taken from the vessel at regular intervals and tested for Epoxy Group Content (EGC). The temperature was maintained at 155 deg C. until an EGC of 470 mmol/kg (solid) or below was obtained. The reaction mixture was then cooled and dissolved in butyl diglycol (350 gm), Dowanol PM (2000 gm) and Solvesso 100 (2290 gm). Final Characteristics of the resin solution: Solids content 39.9% (180 deg C., 30 minutes 0.5 gm), Viscosity 887 mPaS at 25 C, Epoxy Group Content 463 mmol/Kg (solid).

Polyester Resin B

A stirred, heated reaction vessel was equipped with nitrogen sparging and a packed column, condenser and separator/distillate collector. Neopentyl glycol (2555 gm) and trimethylol propane (410 gm) were added to the reactor and heated to 120 deg C. to melt the material. Then the stirrer was started and terephthalic acid (381 gm), lsophthalic acid (2159 gm), adipic acid (1489 gm) and dibutyl tin oxide (3 gm) added to the reactor. The temperature of the reactor was the raised to 160 deg C. when distillation began, a steady rate of distillation was then maintained with the head temperature maintained in the range 98 to 102 deg C. as the reactor temperature was steadily increased to a maximum of 220 deg C. at the end of the process. When the resin mixture had cleared samples were taken at regular intervals for testing of acid value and viscosity. The process was maintained until the acid value had reached 6-10 mg KOH/gm and a viscosity of 12-17 poise at 150 deg C. (cone and plate viscometer), the resin was then diluted in Solvesso 150 ND(3950 gm). Final characteristics of resin: Solids content 60.4% (150 deg C., 60 minutes, 0.5 gm), solution viscosity 22.8 poise at 25 deg C., acid value 7.4 mgKOH/gm (on solids), Mw 11200 (GPC polystyrene standards).

Polyester Resin C

A stirred, heated reaction vessel was equipped with nitrogen sparging and a packed column, condenser and separator/distillate collector. Neopentyl glycol (523 gm) and trimethylol propane (84.10 gm) were added to the reactor and heated to 120 deg C. to melt the material. Then the stirrer was started and terephthalic acid (78.1 gm) lsophthalic acid (442.6 gm), adipic acid (305.3 gm) and stannous octoate (1 gm) added to the reactor. The temperature of the reactor was the raised to 160 deg C. when distillation began. A steady rate of distillation was then maintained with the head temperature maintained in the range 98 to 102 deg C. as the reactor temperature was steadily increased to a maximum of 220 deg C. at the end of the process. When the resin mixture had cleared samples were taken at regular intervals for testing of acid value and viscosity. The process was maintained until the acid value had reached 6-10 mg KOH/gm and a viscosity of 15-25 poise at 150 deg C. (cone and plate viscometer), the resin was then diluted in Solvesso 150 ND(830 gm). Final characteristics of resin: Solids content 59.8% (150 deg C., 60 minutes, 0.5 gm), solution viscosity 2820 mPaS at 23 deg C., acid value 7.5 mgKOH/gm (on solids), Mw 14037 (GPC polystyrene standards).

The Bakelite crosslinker (Bakelite 6535) is a phenol/resol resin from Momentive (low monomer content).

The catalyst TIB Kat VP 08-146 (Bismuth neodecanoate) is from TIB (Goldschmidt)/Mannheim. The Tris-Amino-Phenol NX3 LC hardener/catalyst is from Protex/Synthron. The Dodecyl-Benzoic-Sulphonic-Acid Cycat 600 (or Nacure 5076) is from Cytec (or King-Industries). Optional a wetting substance like Byk 313 from Byk can be used. Optional adhesion promoter like HP-72-1288 from PPG can be used.

TABLE 1

|  | Epoxy resin A % w/w comp. | Polyester resin B % w/w comp. | Polyester resin C % w/w comp. | Bakelite 6535 % w/w comp. | Bismuth neodecanoate % w/w comp. | Tris-Amino-Phenol % w/w comp | Dodecyl-Benzoic-Sulphonic-Acid % w/w comp. |
|---|---|---|---|---|---|---|---|
| Ex. 1 | 61.60 | — | — | 15.00 | 0.30 | — | — |
| Ex. 2 | — | 50.00 | — | 15.00 | 0.30 | — | — |
| Ex. 3 | — | — | 50.00 | 15.00 | 0.30 | — | — |
| Comp. Ex. 1 | 61.60 | — | — | 11.50 | — | — | — |
| Comp. Ex. 2 | 61.60 | — | — | 11.50 | — | — | 0.50 |
| Comp. Ex. 3 | — | 50.00 | — | 15.00 | — | — | — |
| Comp. Ex. 4 | — | 50.00 | — | 15.00 | — | 0.50 | — |
| Comp. Ex. 5 | — | 50.00 | — | 15.00 | — | — | 0.50 |
| Comp. Ex. 6 | — | — | 50.00 | 15.00 | — | — | — |
| Comp. Ex. 7 | — | — | 50.00 | 15.00 | — | 0.50 | — |
| Comp. Ex. 8 | — | — | 50.00 | 15.00 | — | — | 0.50 |

The compositions were prepared by charging the main resin into a container and mixing the solvents, crosslinkers and additives under ambient conditions until homogeneous.

The coated metal substrates were tested according to the test methods discussed above. The results are presented in Table 2 below.

TABLE 2

|  | Viscosity: [seconds] DIN 4 mm at 20° C. | Substrate: M&B-Aluminium-Panels: Systems hardened 4'180° C. | | Substrate: M&B-Aluminium-Panels: Systems hardened 4'200° C. | | Substrate: M&B-Aluminium-Panels: Systems hardened 4'230° C. | | Dipped tubes (12' stand time): Hardened at 4'230° C. Ammonia-Test (3 h at 40° C. with 25% ammonia-solution. Closed tubes): |
|---|---|---|---|---|---|---|---|---|
|  |  | Blue-Test 5 minutes | NMP Test 24 h | Blue-Test 5 minutes | NMP Test 24 h | Blue-Test 5 minutes | NMP Test 24 h |  |
| Ex. 1 | 70 | 1 | 2 | 4 | 3 | 5 | 5 | 5 |
| Ex. 2 | 78 | 4 | 3 | 4 | 4 | 4 | 5 | 5 |
| Ex. 3 | 75 | 2 | 2 | 2 | 3 | 4 | 5 | 5 |
| Comp. Ex. 1 | 70 | 0 | 0 | 2 | 2 | 5 | 5 | 4 |
| Comp. Ex. 2 | 68 | 1 | 0 | 2 | 2 | 5 | 5 | 3 |
| Comp. Ex. 3 | 75 | 3 | 2 | 3 | 4 | 4 | 4 |  |
| Comp. Ex. 4 | 75 | 0 | 0 | 3 | 4 | 4 | 4 | 3 |
| Comp. Ex. 5 | 72 | 4 | 0 | 5 | 0 | 5 | 4 | 0 |
| Comp. Ex. 6 | 72 | 2 | 2 | 2 | 4 | 4 | 3 |  |
| Comp. Ex. 7 | 72 | 0 | 0 | 2 | 4 | 4 | 4 | 3 |
| Comp. Ex. 8 | 70 | 3 | 0 | 3 | 0 | 4 | 4 | 0 |

The results of table 2 show that a coating composition in accordance with the present invention provides improved alkali resistance whilst maintaining other desirable properties.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A coating composition comprising:
   i) a polymeric film forming resin,
   ii) a crosslinking agent suitable for crosslinking the polymeric film forming resin i), and
   iii) an additive comprising a bismuth carboxylic acid salt, wherein the bismuth carboxylic acid salt comprises bismuth neodecanoate and wherein the crosslinking agent comprises one or more of a hydroxyl substituted aromatic group containing agent, an amino group containing agent, an amine group containing agent, a urea-formaldehyde agent or an alkylated urea with imino functionality.

2. A coating composition according to claim 1, wherein the polymeric film forming resin comprises epoxy resin, polyester resin or polyacrylate resin.

3. A coating composition according to claim 1, wherein the crosslinking agent comprises an optionally substituted phenol-aldehyde or phenol-ketone (co)polymer, a melamine formaldehyde type material and/or a benzoguanamine formaldehyde type material.

4. A coating composition according to claim 1, wherein the additive has a pH of 6 to 8.

5. A metal substrate coated with a coating composition according to claim 1.

6. An aluminum substrate coated with a coating composition on at least a portion thereof, the coating composition comprising:
   i) a polymeric film forming resin,
   ii) a crosslinking agent suitable for crosslinking the polymeric film forming resin i), and
   iii) an additive comprising a bismuth carboxylic acid salt, wherein the bismuth carboxylic acid salt comprises bismuth neodecanoate and wherein the crosslinking agent comprises one or more of a hydroxyl substituted aromatic group containing agent, an amino group containing agent, an amine group containing agent, a urea-formaldehyde agent or an alkylated urea with imino functionality.

7. A packaging article coated with a coating composition on at least a portion thereof, the coating composition comprising:
   i) a polymeric film forming resin,
   ii) a crosslinking agent suitable for crosslinking the polymeric film forming resin i), and
   iii) an additive comprising a bismuth carboxylic acid salt.

8. A method of coating a metal substrate comprising applying thereto a coating composition according to claim 1.

9. The packaging article of claim 7, wherein said packaging article is an aluminum tube.

10. The packaging article of claim 7, wherein said packaging article further comprises a cosmetic item.

* * * * *